United States Patent [19]
Santorelli

[11] 3,764,669

[45] Oct. 9, 1973

[54] METHOD OF MAKING MICROBIOCIDAL COMPLEXES

[76] Inventor: Salvatore L. Santorelli, 160-14 Tenth Ave., Whitestone, N.Y. 11357

[22] Filed: Nov. 2, 1970

[21] Appl. No.: 66,583

Related U.S. Application Data

[63] Continuation-in-part of Ser. No. 754,098, Aug. 12, 1968, which is a continuation of Ser. No. 507,515, Nov. 12, 1965, abandoned, which is a continuation-in-part of Ser. No. 431,714, Feb. 10, 1965, abandoned, which is a continuation-in-part of Ser. No. 220,907, Aug. 31, 1962, abandoned, which is a continuation-in-part of Ser. No. 852,174, Nov. 12, 1959, abandoned, which is a continuation-in-part of Ser. No. 773,809, Nov. 14, 1958, abandoned.

[52] U.S. Cl..................... 424/80, 260/431, 424/146
[51] Int. Cl................................................ A61k 7/27
[58] Field of Search..................... 424/80, 146, 150,

424/291

[56] References Cited
UNITED STATES PATENTS

| | | | |
|---|---|---|---|
| 1,686,062 | 10/1928 | Amacker | 424/51 |
| 2,739,922 | 3/1956 | Shelanski | 424/150 |

*Primary Examiner*—Richard L. Huff

[57] ABSTRACT

The present invention is directed to a complex compound consisting of a complex combination of salicylic acid, iodine and a mercurial. The complex compound is further identified as salicylic acid in combination with polyvinylpyrrolidone-iodine or iodine/sodium iodide and sodium ethylmercurithiosalicylate or sodium dibromoxymercurifluorescein. These compounds have indicated fungicidal and bactericidal activity when applied topically.

7 Claims, No Drawings

METHOD OF MAKING MICROBIOCIDAL COMPLEXES

The present application is a continuation-in-part of my co-pending application Ser. No. 754,098 filed Aug. 12, 1968 which was a continuation of application Ser. No. 507,515 filed Nov. 12, 1965 which was a Continuation-in-Part of application Ser. No. 431,714 filed Feb. 10, 1965 which was a Continuation-in-Part of application Ser. No. 220,907 filed Aug. 31, 1962 which was a Continuation-in-Part of application Ser. No. 852,174 filed Nov. 12, 1959 which was a Continuation-in-Part of application Ser. No. 773,809 filed Nov. 14, 1958 all now abandoned.

The present invention is directed to a complex compound consisting of salicylic acid, an iodine and a mercurial compound. The iodine compounds for example are polyvinylpyrrolidone-iodine and iodine/sodium iodide. The mercurial compounds are for example, sodium ethylmercurithio-salicylate and sodium dibromoxymercurifluorescein. The resultant complex compounds formed by this combination of reactants has proven to be very difficult and impossible to isolate and analyze since any attempt to isolate and analyze the compounds has caused their break-down.

These complex compounds relate to therapeutic compositions for topical application having keratolytic and keratoplastic properties including bactericidal and fungicidal effects on skin disorders due to fungus and/or bacterial infections. These compounds are prepared as saturated solutions of salicylic acid, 18–22 grams in propylene glycol or in 60–70 percent alcohol together with 0.1 to 2 grams of iodine and 0.1 to 2 grams of mercury containing antiseptics such as polyvinylpyrrolidone iodine (Isodine), iodine/sodium iodide, sodium dibromoxymercurifluorescein (Mercurichrome), and sodium ethyl-mercurithiosalicylate (Merthiolate), wherein there is present in solution salicylic acid in excess of 10 grams per 100 cc. of an aliphatic alcohol or propylene glycol after the addition of all the antiseptics which have reacted.

It has been known and practiced by those skilled in the art that the demarkation between a weak solution and a strong solution of salicylic acid in an alcohol is placed at 6 percent (gm. per 100 cc.) salicylic acid for the treatment of all kinds of skin infections. A strong solution of 12 percent (gm. per 100 cc.) salicylic acid in alcohol has shown keratolytic action and has been cautiously used only in cases of unbroken skin, for example, in the removal of corns, warts and horny layers of skin. The use of a strong solution of salicylic acid causes inflammation of the painted areas with attendant damage to capillary blood vessels and the formation of blisters on broken or infected skin; the strong solution smarts and pains causing inflammation of the treated area and edema. A weak solution of salicylic acid (below 6 percent) having keratoplastic action removes inflammation and reduces edema with attendant healing of the infected area (Goodman, Cosmetic Dermatology, McGraw Hill Book Co. (1936) Pages 454–459). The antiseptics used individually such as polyvinylpyrrolidone iodine (Isodine), iodine/sodium iodide, sodium dibromoxymercurifluorescein (Mercurichrome), and sodium ethylmercurithiosalicylate (Merthiolate), have a certain degree of bactericidal and fungicidal properties and have been used in prolonged treatment on mild cases of fungicidal or bactericidal infections. However, these antiseptics used individually have little effect in acute and chronic cases of fungicidal or bactericidal infections and in some infections are totally ineffectual. These antiseptics do not possess the broad fungicidal and bactericidal effectiveness of the complex compounds of the present invention which is capable of combating acute and chronic fungicidal and/or bactericidal infections with normally two to four applications of said composition without traumatic effects.

Furthermore, the amounts used according to the present invention, of each individual antiseptic heretofore listed, are toxic when used individually, whereas when used as a complex compound in the solution as prepared, have proven to be non-toxic as compounds.

Cornbleet (Arch. Dermatology, March, 1948, Pages 335,336) used polyvinylpyrrolidone iodine and clearly stated that in order to effect any clearing of a condition such as eczmatoid ringworm, it is required that the polyvinylpyrrolidone iodine be applied to the infected area twice a day over a prolonged period of time. The compositions containing the complex compounds of the present application, as set forth in the examples, required in most every instance only one to three applications of the composition once a day over a 24 to 72 hour period of time to clear the infected area with a replacement of new healthy epithelial tissue.

The complex compounds of the present invention are contained in a solution of 100 cc. of propylene glycol or 60–70 percent alcohol, with salicylic acid in excess of 10 grams including the reaction product of the antiseptics. These compositions have been used in the treatment of acute and chronic skin diseases such as athlete's foot, intertrigo, seborrhoeic keratoses, monilia vaginitis, etc. which had not responded or poorly responded to any other form of therapy. In most cases only two to three applications of these compositions were required to relieve and heal the infected area. These compositions which contain 18–22 grams of salicylic acid in 100 cc. of propylene glycol or 60–70 percent aqueous alcohol, in the light of prior medical art, are considered to be strong solutions of salicylic acid harmful to living tissue, however, actually appear to attack only the infected area and to have no effect on the healthy surrounding tissue giving immediate relief to the patient. The inflammation caused by the fungus and/or bacteria subsides and disappears with no attendant edema or damage to the capillary blood vessels even though the solutions which include the complex compound, containing in excess of 10 grams of salicylic acid, according to the present invention, are applied to said infected area.

To effect good healing, it is necessary that all the infected tissue is cleared away as tissue debris from an infected area and for this purpose a keratolytic action is required. The prior art cites salicylic acid as a good keratolytic agent if used in excess of 10 grams, however, because of its severe action in high concentrations it is never used on living tissue or in open infected areas. Goodman adequately covers this. The solutions listed hereinafter retain their keratolytic nature in spite of the high concentration of salicylic acid without any of the severe action attendant thereto when salicylic acid is used alone. The compositions of this application also have a keratoplastic action as evidenced with acceleration of growth of new healthy tissue when applied to infected skin areas as evidenced in the clinical studies. Therefore, the compositions have evidenced both a keratolytic and keratoplastic action when applied to fungicidal or bactericidal infections without traumatic effect.

The complex compounds in the compositions of the present invention were tested with the following results:

Several cases of tinea pedia (athlete's foot) were treated by one to three applications of typical compositions of the invention. It was observed that on applying the compositions to the infected areas, which had skin break with attendant discharge and itchiness, all signs of infection disappeared within 24 hours. The infected skin with fission in the infected areas peeled off leaving new skin in place thereof, closing the said skin break. In comparing the effect of the individual components of the mixtures of this invention with the compositions of the present invention, in the average infected patient, it took at least a week or more to clear up athlete's foot with said components; whereas with the present inventive compositions, the fungus condition was greatly alleviated with marked visual improvement within 24 hours. Growth of new skin was also observed within said period of time. Patients having both acute and chronic infections were given up to three applications of the composition. All of these patients were immediately relieved of their itchiness and of their acute symptoms, including puritus, intense erythema, vesiculation and fissuring, with resultant healing.

Three patients were treated for seborrhoeic keratoses with scalp lesions by applying the present inventive compositions with cotton wound applicators. All of the keratoses healed in a few days.

Seborrhoeic dermatitis with fissuring was treated by painting the infected area; all showed marked improvement and healing.

Several patients were treated for intertrigo, under the breasts, in the axillae and in the groins with two to three applications of the compositions. The condition in all the patients was cleared up.

Patients were treated for monilia vaginitis with compositions of this invention and it was found to be an effective treatment of monilia infections which had not responded to any other form of therapy.

The solutions used showed unusual properties for stimulating healing in chronic and acute fissuring of the skin. The patients evidenced an intense smarting only of the infected area when painted with the compositions of the present invention which smarting in some instances lasted for five minutes; however, no traumatic effect or injury to the skin or mucous membranes was evidenced as a result. The unbearable condition of itchiness in all cases immediately subsided and did not recur.

The compositions of the present invention have the further advantages in that they protect the wound from infection allowing it to heal normally and rapidly forming a protective coating and obviates the need for bulky dressings.

A number of propylene glycol and aqueous alcoholic solutions were prepared using 60 to 70 vol. percent alcohol and 40 to 30 vol. percent $H_2O$, preferentially a lower aliphatic alcohol such as methyl, ethyl or isopropyl alcohol was used in which 18 to 22 grams of salicylic acid was dissolved. 100 cc. of 70 percent alcohol will dissolve no more than 22 grams of salicylic acid at room temperature. In other words, a saturated solution or preferentially 20 grams of salicylic acid was prepared in the alcohol or 18 grams of salicylic acid in 100 cc. propylene glycol. To these solutions was added 0.1 to 2 grams of any of the following antiseptics, sodium dibromoxymercurifluorescein (Mercurichrome), iodine/sodium iodide, sodium ethylmercurithiosalicylate (Merthiolate) or polyvinylpyrrolidone iodine complex (Isodine), the mercurials in combination with the iodine compounds so that in excess of 10 grams of salicylic acid remains in the composition after said addition. All of these above compositions were medically tested.

The complex compounds in these solutions were prepared by dissolving salicylic acid in alcohol or propylene glycol as set forth hereinabove; to this solution 0.1 to 2 grams of polyvinylpyrrolidone-iodine complex (Isodine) or iodine/sodium iodine was added, an endothermic reaction was evidenced, coloring the solution, an iodine brownish-red. This solution was divided into two portions. 0.1 to 2 grams of sodium ethylmercurithiosalicylate (Merthiolate) was added to the first portion whereupon an immediate and instantaneous change of color of the solution was evidenced, from a brownish-red solution to an immediate colorless solution. The second portion was left standing for 24 hours after which time further evidence as to the solution had changed from a brownish-red to a pale yellow, almost colorless solution. The structure of the product of reaction could not be identified since the compound or complex which had formed and was completely in solution broke down under analytical procedures. A reaction has undoubtedly occurred binding the individual compounds into a singular complex compound which proved non-toxic and pharmaceutically beneficial.

There is nothing generally known about these ingredients which would suggest that they should form a complex or change color.

When the complex compounds in the alcoholic compositions or propylene glycol compositions prepared according to present invention were tested in vitro, they showed the following results:

A. 1a. Prevented growth of staphylococcus aureus (FDA No. 209) in a dilution of 1:1000. Phenol coefficient of the solution against the Staphylococcus aureus equaled 2.5.

1b. Prevented growth of Trichophyton mentographytes (ATCC No. 4807) in a dilution of 1:100.

2. Prevented growth of Salmonella typhosa (ATCC No. 6539) in dilution of 1:100. Phenol coefficient of the solution against Salmonella typhosa equaled 3.3.

3. Prevented growth of Streptococcus hemolyticus (P&S No. 15-A) in a dilution of 1:100.

4. Prevented growth of Mycobacterium smegmitis (ATCC No. 10143).

5. Prevented growth of Mycabacterium tuberculosis var. hominis (H37RA).

B. Prevented growth in the following fungus and one yeast:

Cryptococcus neoformans (ATCC No. 10226)
Microsporum canis (ATCC No. 10214)
Microsporum gypseum (ATCC No. 9083)
Trichoderme veride (ATCC No. 8678)
Candida Albicans (ATCC No. 752)
Nocardra asteroides (ATCC No. 10904)

In a measurement to determine the oral $LD_{50}$ in rats it was determined that the $LD_{50}$ was 3,700 mg/kg. This is a very low level of toxicity. The confidence limits are 2,569 to 2,328 mg/kg. The individual compounds used in the solution of the present invention are toxic in the amounts used, however, these individual compounds are now bound by a chemical reaction, with the solution containing salicylic acid in excess of 10 grams in said solution, yet evidencing non-toxicity for the solution.

Examples of the therapeutic compositions of the mixture which proved effective in the alcohol or propylene glycol solutions are as follows:

EXAMPLE 1

A solution of 20 grams of salicylic acid in 100 cc. of an aqueous solution of 70 percent alcohol was prepared. Add to this solution 1 gram of iodine and 1.4 gram of sodium iodide and 0.1 gram of Merthiolate sequentially with mixing to form a complex compound of said reactants.

EXAMPLE 2

A solution of 20 grams of salicylic acid in 100 cc. of an aqueous solution of 70 percent alcohol was prepared. Add to this solution 0.1 gram of Isodine and 0.1 gram of Merthiolate sequentially with mixing to form a complex compound of said reactants.

EXAMPLE 3

A solution of 20 grams of salicylic acid in 100 cc. of an aqueous solution of 70 percent alcohol was prepared. Add to this solution 0.1 gram of Isodine and 0.1 gram of Mercurichrome sequentially with mixing to form a complex compound of said reactants.

EXAMPLE 4

A solution of 20 grams of salicylic acid in 100 cc. of an aqueous solution of 70 percent alcohol was prepared. Add to this solution 2 grams of iodine/2.4 grams sodium iodine and 2 grams of Merthiolate sequentially with mixing to form a complex compound of said reactants.

EXAMPLE 5

A solution of 20 grams of salicylic acid in 100 cc. of an aqueous solution of 70 percent alcohol was prepared. Add to this solution 2 grams of Isodine and 2 grams of Merthiolate sequentially with mixing to form a complex compound of said reactants.

EXAMPLE 6

A solution of 20 grams of salicylic acid in 100 cc. of an aqueous solution of 70 percent alcohol was prepared. Add to this solution 2 grams of Isodine and 2 grams of Mercurichrome sequentially with mixing to form a complex compound of said reactants.

EXAMPLE 7

18 grams of salicylic acid was dissolved in 100 cc. of propylene glycol. Add to this solution 0.1 gram of Isodine and 0.1 gram of Merthiolate sequentially with mixing to form a complex compound of said reactants.

EXAMPLE 8

18 grams of salicylic acid was dissolved in 100 cc. of propylene glycol. Add to this solution 2 grams of Isodine and 2 grams of Merthiolate sequentially with mixing to form a complex compound of said reactants.

EXAMPLE 9

18 grams of salicylic acid was dissolved in 100 cc. of propylene glycol. Add to this solution 1 gram of iodine/1.4 grams of sodium iodide and 0.1 gram of Merthiolate sequentially with mixing to form a complex compound of said reactants.

EXAMPLE 10

18 grams of salicylic acid was dissolved in 100 cc. of propylene glycol. Add to this solution 2 grams of iodine/2.4 grams of sodium iodide and 2 grams of Merthiolate sequentially with mixing to form a complex compound of said reactants.

EXAMPLE 11

18 grams of salicylic acid was dissolved in 100 cc. of propylene glycol. Add to this solution 0.1 gram of Isodine and 0.1 gram of Mercurichrome sequentially with mixing to form a complex compound of said reactants.

EXAMPLE 12

A solution of 20 grams of salicylic acid in 100 cc. of an aqueous solution of 70 percent alcohol was prepared. Add to this solution 0.1 gram of Isodine, 0.1 gram Merthiolate, 0.1 gram Ethanolamine, .03 gram Ethylenediamine and 1 cc. of Acetone sequentially with mixing to form a complex compound of said reactants.

The following table illustrates the complex compound formed in the various compositions prepared in 100 cc. of propylene glycol, 60–70 percent alcohol/40–30 percent water, the alcohol used being preferably ethanol. Good results were obtained throughout using the composition of the invention and most excellent therapeutic results were obtained using a 20 gram solution of salicylic acid in 60 to 70 percent alcohol or 18 grams of salicylic acid in propylene glycol.

| Salicylic acid in 60-70% alcohol or propylene glycol | Sodium dibromoxy-mercuri-fluorescein, grams | Polyvinyl-pyrrolidone-iodine complex, grams | Iodine/sodium iodide, grams | Merthiolate R, grams |
|---|---|---|---|---|
| (1) 18 to 22 grams Salicylic acid/100 cc. alcohol or propylene glycol | | | 0.1-2/1-2.4 | 0.1-2 |
| (2) do | | 0.1-2 | | 0.1-2 |
| (3) do | 0.1-2 | 0.1-2 | | |

The use of 70 percent alcohol is effective for deep penetration and for controlling the amount of salicylic acid (22 grams) which will dissolve in 100 cc. of the alcohol at room temperature.

The compositions containing the complex compounds of the present invention have a threefold effect, namely a keratolytic action clearing away the infected or diseased tissue, a deep penetration carrying the product of the reaction to the site of the infection and a keratoplastic effect causing a reduction in the inflammation with an acceleration of healing.

Investigation has shown that only the infected areas are attacked by the compositions so that the surrounding healthy skin area is not at all affected.

The complex compounds in the compositions described hereinbefore can also find effective veterinarian use. For all purposes they may be applied topically in any conventional manner used for solutions including a spray or in the form of ointments. From a review of the solutions containing the compositions of the present invention and their bactericidal and fungicidal effects, their industrial applications can be readily foreseen.

While there are above disclosed but a limited number of embodiments of the process and products of the invention herein disclosed, it is possible to produce still other embodiments without departing from the inventive concept herein disclosed, and it is desired therefore that only such limitations be imposed on the appended claims as are stated therein. foreseen.

What I claim is:

1. A process for the preparation of a bactericidal and fungicidal complex compound for topical application, said compound consisting of salicyclic acid, polyvinyl-pyrrolidone-iodine and sodiumethylmercurithiosalicylate in complex combination, comprising the sequential steps of dissolving 18 to 22 grams of salicylic acid in 100 cc. of propylene glycol or a 60 to 70 percent by volume solution of a $C_{1-3}$ alkanol in water, adding to the resulting solution about 0.1 to 2 grams of polyuinyl-pyrrolidone-iodine, and then adding to the resulting mixture about 0.1 to 2 grams of sodiumethylmercuri-thiosalicylate.

2. A process according to claim 1 in which 2 grams of polyvinylpyrrolidone-iodine and 2 grams of sodium ethylmercurithiosalicylate are sequentially added to the salicylic acid solution. polyvinylpyrrolidone-iodine, 3. A process according to claim 1 in which 0.1 gram of polyvinylpyrrolidone-iodine and 0.1 gram of sodium ethylmercurithiosalicylate are sequentially added to the salicylic acid solution.

4. A process as defined in claim 1 wherein the salicylic acid is dissolved in a 70 percent by volume solution of a $C_{1-3}$ alkanol in water.

5. A process as defined in claim 2 wherein said alkanol is ethanol.

6. A process as defined in claim 5 in which 2 grams of polyvinylpyrrolidone-iodine and 2 grams of sodium-ethylmercurithiosalicylate are sequentially added to the salicylic acid solution.

7. A process as defined in claim 5 in which 0.1 gram of polyvinylpyrrolidone-iodine and 0.1 gram of sodium-ethylmercurithiosalicylate are sequentially added to the salicylic acid solution.

* * * * *